(12) United States Patent
Fath

(10) Patent No.: US 7,919,147 B2
(45) Date of Patent: Apr. 5, 2011

(54) COATING METHOD

(75) Inventor: Andreas Fath, Haslach (DE)

(73) Assignee: Hansgrohe AG, Schiltach (DE)

( * ) Notice: Subject to any disclaimer, the term of this patent is extended or adjusted under 35 U.S.C. 154(b) by 1048 days.

(21) Appl. No.: 10/534,560

(22) PCT Filed: Nov. 13, 2003

(86) PCT No.: PCT/EP03/12697
§ 371 (c)(1),
(2), (4) Date: Dec. 22, 2006

(87) PCT Pub. No.: WO2004/044071
PCT Pub. Date: May 27, 2004

(65) Prior Publication Data
US 2008/0063859 A1  Mar. 13, 2008

(30) Foreign Application Priority Data

Nov. 14, 2002  (DE) .................................. 102 53 839

(51) Int. Cl.
*B05D 3/00* (2006.01)
*B05D 3/02* (2006.01)
(52) U.S. Cl. .................. 427/387; 427/372.2; 427/388.1; 427/388.4
(58) Field of Classification Search .................. 427/327, 427/387, 372.2, 384, 388.1, 388.4
See application file for complete search history.

(56) References Cited

U.S. PATENT DOCUMENTS

| 6,162,498 A | 12/2000 | Mennig et al. |
| 2002/0099161 A1 | 7/2002 | Mager |
| 2004/0062873 A1* | 4/2004 | Jung et al. .................. 427/407.1 |

FOREIGN PATENT DOCUMENTS

| DE | 195 35 729 A1 | 3/1997 |
| DE | 195 44 763 A1 | 6/1997 |
| DE | 197 14 949 A1 | 10/1998 |
| DE | 198 16 136 A1 | 10/1999 |
| DE | 199 57 325 A1 | 5/2001 |
| DE | 100 04 132 A1 | 8/2001 |
| DE | 101 02 739 A1 | 7/2002 |
| EP | 0 669 385 A1 | 8/1995 |
| EP | 1 127 930 A1 | 8/2001 |
| GB | 2 362 846 A | 12/2001 |
| WO | WO 01/90267 A2 | 11/2001 |
| WO | WO 02/31064 | * 4/2002 |

OTHER PUBLICATIONS

Machine Translation, Volker et al. EP 1127930, Aug. 2001.*

* cited by examiner

*Primary Examiner* — Michael La Villa
(74) *Attorney, Agent, or Firm* — Duane Morris LLP

(57) ABSTRACT

The invention relates to a method for coating objects, particularly plumbing fixtures, having metallic surfaces. According to the method, at least one organosilane is applied during the so-called sol-gel process after an optionally provided pre-treatment step that serves to activate the metallic surfaces, and the coating obtained thereby is transformed into a polysiloxane coating. This transformation of the coating into a polysiloxane coating preferably ensues by a thermal treatment effected at temperatures of <100° C., preferably <70° C.

16 Claims, No Drawings

COATING METHOD

The invention relates to a method for coating articles, in particular sanitary articles, such as sanitary fittings, having at least partly metallic surfaces, and the articles which can be produced by this method.

A very wide range of articles have for various reasons long been coated with inorganic or organic substances. Reasons for these coatings are firstly functional requirements, for example corrosion protection, and secondly decorative requirements, for example the visual appearance. In general, articles are coated both for functional and for decorative reasons.

For the various applications, both organic coating systems (organic polymers) and inorganic coating systems (metals, ceramic, glass) are widely used. In many cases, particularly with the use of inorganic coating systems, however, the use of corresponding coating materials is unsuccessful because there is no coating method which can be used industrially. The so-called sol-gel method, which also appears in the literature under the key word "sol-gel coatings", has provided a certain remedy here.

In the sol-gel method, hydrolyzable inorganic compounds are used as starting materials. Particularly widely used here are alkoxides of titanium, aluminum, zirconium and silicon. These compounds are hydrolyzed in a first reaction step (reaction with water in the presence of catalysts). This hydrolysis leads to a reactive intermediate, the so-called sol. In this sol, the hydrolyzed compounds are present as colloidal particles. The sol can then serve as a coating system. The sol is then reacted in a second reaction step, a condensation reaction, to give polymeric compounds. The so-called gel forms thereby as a result of gelling. The condensation reaction is usually effected by using relatively high temperatures, for example >140° C., so that this step is comparable with so-called baking in the case of conventional finishes.

Once the condensation reaction is complete, inorganic oxidic polymer structures are usually present. It is also possible, by adding organic components, to use the sol-gel method for the preparation of inorganic-organic hybrid polymers.

While the principles of the sol-gel method have been comparatively thoroughly investigated scientifically, the technical implementation still presents difficulties in many cases. This applies in particular to the coating of articles which set particularly high requirements both from the functional point of view and from the decorative point of view. These are, for example, sanitary articles which are used in the bathroom and kitchen, in particular the so-called sanitary fittings. Fittings, and sanitary articles generally, have to be corrosion resistant to a high degree, easy to clean and scratch-resistant, to mention but a few of the technical requirements. At the same time, the sanitary articles must meet the decorative demands, i.e. it must be possible to realize, for example, shiny or matt surfaces also with applied coating. In this context, it is necessary to take into account that the body of sanitary articles, in particular sanitary fittings, may consist of different materials, for example brass or plastic, which in turn result in different boundary conditions for a coating method. In particular, the use of plastics bodies, for example comprising ABS (acrylonitrile-butadiene-styrene copolymer) sets particular requirements here since such plastics are not resistant to relatively high temperatures, for example >100° C.

Accordingly, it is the object of the invention to provide an improved method for coating articles, in particular sanitary articles, such as sanitary fittings, having at least partly metallic surfaces. This method should be capable of being used universally, i.e. it should be capable of being carried out reliably, independently of the material on which the metallic surfaces are present. In particular, however, the method should be suitable for coating articles where the metallic surfaces are present on a body of plastic, in particular a plastic which is not heat-resistant at relatively high temperatures (>100° C.). In this way, novel coated articles are to be provided by the invention.

According to the invention, in the method mentioned at the outset, optionally at least one pretreatment step for activating metallic surfaces is carried out. At least one organosilane is then applied to the metallic surfaces by the so-called sol-gel method, and the coating thus obtained is converted into a polysiloxane coating. This conversion is effected according to the invention preferably by thermal treatment at temperatures of <100° C. In particular, temperatures of <70° C. are used so that thermal deformations of a possibly used heat-sensitive material for a body (for example a plastic) are reliably ruled out. The duration of the thermal treatment is preferably from 15 minutes to 2 hours, in particular from 30 minutes to 1 hour.

The thickness of the polysiloxane coating finally resulting from the method is comparatively small compared with conventional coatings and is preferably <5 μm. In particular, the coat thickness is <1 μm. Since the organosilane applied in the invention is present in the sol in the form of colloidal particles having sizes in the nanometer range and the coat thickness of the polysiloxane coating is in the nanometer range, it is possible in the case of the coating applied according to the invention to speak of a nanomer coating in the wider sense.

It is furthermore preferred in the invention if a mixture of a plurality of organosilanes is applied to the metallic surfaces. This is preferably a mixture consisting of two organosilanes. Such organosilane mixtures preferably contain no separate organic components which could lead to a parallel buildup of organic chains. In the context of the introductory observations, this means that the polysiloxane resulting in these preferred embodiments has a substantially inorganic character.

According to the invention, the organosilane or the organosilane mixture is preferably used as a colloidal aqueous solution. The solids content of such solutions is preferably from 1% by weight to 30% by weight. The use of such aqueous colloidal solutions results in an environmentally friendly procedure or in environmentally friendly coatings.

In principle, a very wide range of organosilanes can be used according to the invention. However, the use of, in particular, modified fluoroalkylsilanes is preferred. These can be provided in aqueous solution. Preferably, such a silane is 1H,1H,2H,2H-perfluorooctyltriethoxysilane or 1H,1H,2H,2H-perfluorodecyltriethoxysile.

It is just as preferable if a (poly)alkoxysilylalkane, preferably 1,2-bistriethoxysilylethane, is used as the organosilane.

Taking the silanes singled out above as a basis, the use of organosilane mixtures comprising a modified fluoroalkylsilane, preferably comprising 1H,1H,2H,2H-perfluorooctyltriethoxysilane or comprising 1H,1H,2H,2H-perfluorodecyltriethoxysilane with a (poly)alkoxysilylalkane, preferably 1,2-bistriethoxysilylethane, is preferred according to the invention.

As already explained, the method according to the invention can be carried out advantageously particularly when the metallic surfaces are present on a plastics body. The corresponding plastic may be one which is not resistant to relatively high temperatures, in particular to temperatures of >100° C. In particular, ABS (acrylonitrile-butadiene-styrene copolymer) may be mentioned here as a plastic. Only for the sake of completeness, it should be mentioned that the invention does of course also include embodiments in which the plastic which carries the metallic surfaces is itself in turn applied to another material, for example in the form of a coating.

In a second group of preferred embodiments of the invention, the metallic surfaces are present on a body comprising stainless steel, aluminum, (die cast) zinc or brass or are directly formed by these materials. Here too, these materials themselves can in turn be formed on a further substrate.

According to the invention, the metallic surfaces can in principle be the surfaces of any desired metals or metal alloys. The article to be coated may be produced from the corresponding metal or corresponding metal alloy itself. Moreover, the cases where a body, for example comprising plastic, is coated with the corresponding metal or the corresponding metal alloy are preferred. In such cases, this coating need not be present on all surfaces of the body. It is sufficient if these surfaces are at least partly coated with the corresponding metal or the corresponding metal alloy. This metal coat or alloy coat may be applied to the body by any desired physical, chemical or electrochemical processes.

In this context, it is preferred in the method according to the invention if the metallic surfaces are those comprising nickel, nickel-tungsten, palladium-nickel, chromium, aluminum or steel. In the case of steel, these surfaces preferably consist of stainless steel. All these metallic materials are frequently used in particular in the sanitary sector, either as a metallic body (steel, stainless steel, e.g. brushed stainless steel, aluminum) or as a metallic coating (nickel, e.g. matt nickel, nickel-tungsten, palladium-nickel, chromium) on another base material. Such coatings, in particular nickel coatings, may include a copper coat, preferably on a plastics body. Further inorganic coats, for example deposited by PVD methods, in particular comprising nitrides (such as TiN, ZrN or ZrCN), may preferably be present on these materials, in particular on metallic surfaces of chromium.

Methods in which the metallic surfaces are those comprising copper or comprising a noble metal or all alloys thereof are likewise preferred according to the invention. Among the noble metals, silver or gold and alloys thereof may be mentioned in particular here. Particularly silver and gold can be used as metallic surfaces in the sanitary sector for particularly high-quality products.

Particularly in cases where metallic surfaces comprising copper or comprising a noble metal (preferably silver or gold) are coated, a particular procedure is advantageous according to the invention. Before the application of the organosilane to the metallic surfaces, a so-called primer is applied to these metallic surfaces. This primer serves for improving the adhesion of the organosilane to the metallic surface. This additional process step is appropriate in particular in the cases where the metallic surfaces are freshly deposited (preferably electrochemically) before the organosilane is applied. Electrochemically deposited coats of copper, gold or silver may be mentioned in particular here.

The primer mentioned is preferably a long-chain, ω-functionalized mercaptan. This is used in particular in alcoholic, preferably ethanolic, solution. Such mercaptans can be represented by the formula $HS-(CH_2)_n-X.$ As is evident from the formula, a further functional group is present in the ω-position relative to the mercapto group, it being possible for X to be a hydroxyl, carboxyl, formyl, acetyl, vinyl, amino, quinyl, hydroquinyl, triethyleneglycyl or amido group. Mercaptans in which the functional group X is the hydroxyl group are preferred.

The skeleton of the aliphatic chain between mercapto group and functional group X, which skeleton is represented in the above formula, can, according to the invention, also be lengthened or modified by ethylene glycol units. The corresponding compounds can be represented by the following formula:

$HS-(CH_2)_n\text{-}EG)_m\text{-}X$ with EG as a symbol for the ethylene glycol unit.

The following may be singled out as preferred primers in the context of the above embodiments:
11-mercapto-1-undecanol ($HS-(CH_2)_{11}-OH$) and
1-mercaptoundec-11-yl)tetra(ethylene glycol) ($HS-(CH_2)_{11}\text{-}EG)_4\text{-}OH$).

A further explanation of the use of said primers in the method according to the invention is given in the examples below.

As already discussed, at least one pretreatment step can be carried out in the method according to the invention for activating the metallic surfaces before carrying out the sol-gel method. The chemical and/or physical methods used thereby are in principle known to a person skilled in the art. These are, for example, suitable degreasing steps which are known under the key words anodic degreasing, cathodic degreasing, hot degreasing, ultrasonic degreasing and the like. Solvents used are, for example, trichloroethylene (Tri) or tetrachloroethylene (perchloroethylene, Per). These methods can be used for the different metal surfaces (also dependent on the body used in each case) and can be modified. In particular cases, for example in the case of matt chromium substrates, special preliminary cleaning/activation steps may also be appropriate, for example an anodic oxidation in dilute phosphoric acid.

In the above-discussed embodiments of the method according to the invention, a substantially colorless polysiloxane coating is obtained on the metallic surface. This means that the coated article, in particular the sanitary fitting, corresponds in visual appearance to the uncoated article. According to the invention, however, it is also possible to modify the method so that colored coatings form. Accordingly, suitable dyes or pigments can be mixed into the organosilane or the organosilane mixture. The dyes/pigments are incorporated thereby into the polysiloxane coating. This results in a translucent and lightfast coating with retention of the overall metallic character of the coated article. The triphenylmethane dyes may be mentioned as suitable dyes in this context. Coloring with inorganic colored pigments such as chromates, permanganates and cyanoferrates is also possible.

According to the invention, the organosilane can be applied to the metallic surfaces in various ways. Immersion, flooding and spin coating may be mentioned as key words here. According to the invention, it is preferable if the organosilane or the organosilane mixture is sprayed onto the metallic surfaces. According to the invention, the opening of the spray nozzle can be kept very small, with diameters of less than 0.7 mm. Values of from 1 bar to 10 bar, preferably from about 2 bar to about 5 bar can be used as the so-called spray admission pressure.

As described above, the invention comprises the coated articles which can be produced by the method according to the invention. These are preferably any type of sanitary articles used functionally or decoratively in the bathroom or kitchen. In particular, the so-called sanitary fittings may be mentioned here.

The coated articles according to the invention are preferably composed of a brass body or a plastics body, at least one, and preferably exactly one, metal coat present on the body and a polysiloxane coating present on the metal coat. The metal coat preferably consists of nickel, palladium-nickel (PdNi), nickel-tungsten (NiW) or chromium. If a plastics body is used, it preferably consists of ABS (acrylonitrile-butadiene-styrene copolymer). In this context, reference is made expressly to the above embodiments of the method according to the invention.

Articles which are coated according to the invention and are composed of a metallic body of brass, stainless steel, aluminum and zinc (die cast) or a plastics body, at least one, and preferably exactly one, metal coat present on the body, a coat of silver or gold present on this metal coat, a primer coat present on the silver or gold coat and a polysiloxane coating on the primer coat are likewise preferred. Here too, in particular nickel, palladium-nickel, nickel-tungsten and chromium may be mentioned as metals for said metal coat. Where a plastics body is used, one comprising ABS is likewise preferred. The primer coat preferably consists of a long-chain, co-functionalized mercaptan. In this context, reference is made to the above embodiments of the method according to the invention.

In line with the above embodiments, the following coated articles according to the invention are to be singled out below. These are coated articles having the following structure/coat structure:

1. Article comprising
a plastics body, preferably comprising-ABS,
a nickel coat present on the plastics body, and
a polysiloxane coating present on the nickel coat.

2. Article comprising
a brass body,
a nickel coat present on the brass body, and
a polysiloxane coating present on the nickel coat.

3. Article comprising
a plastics body, preferably comprising ABS,
a nickel coat present on the plastics body,
a silver coat present on the nickel coat,
a primer coat, preferably comprising a long-chain, ω-functionalized mercaptan, present on the silver coat, and
a polysiloxane coating present on the primer coat.

Preferably, a copper coat may be present on the plastics body under the nickel coat.

4. Article comprising
a brass body,
a nickel coat present on the brass body,
a silver coat present on the nickel coat,
a primer coat, preferably comprising a long-chain, ω-functionalized mercaptan, present on the silver coat, and
a polysiloxane coating present on the primer coat.

In the case of all articles described, the polysiloxane coating has, according to the invention, a coat thickness which is small in comparison with conventional coatings. The coat thickness is preferably <5 µm, in particular <1 µm.

The method according to the invention and the coated articles resulting therefrom have a large number of advantages. The polysiloxane coats obtained have high transparency and low reflectivity. The polysiloxane surfaces are easy to clean and have a good water repellent effect. They are scratch-resistant and UV-stable. The corrosion resistance, too, is very good. If the coatings are applied to a metallic surface comprising silver and/or gold, effective antitarnish properties are imparted to these metals. All these properties make the method according to the invention and the articles obtained particularly suitable for use in the sanitary sector. The high requirements mentioned at the outset and set in this sector can reliably be met.

Finally, the invention also comprises a composition for coating articles, in particular sanitary articles, as may be used in the method according to the invention. This composition is characterized in that it is an organosilane mixture comprising at least one, in particular modified fluoroalkylsilane, preferably comprising 1H,1H,2H,2H-perfluorooctyltriethoxysilane or comprising 1H,1H,2H,2H-perfluorodecyltriethoxysilane, and a (poly)alkoxysilylalkane, preferably 1,2-bistriethoxysilylethane. The composition is preferably an aqueous solution, i.e. a solution in which the main solvent component is water. Organic solvents, preferably alcohols, in particular ethanol, may be present in small amounts. Optionally, the composition according to the invention may be present in the form of a solution which contains a comparatively small proportion of water and is then correspondingly diluted immediately before use by adding water. All compositions according to the invention are usually colloidal solutions in which the reactive monomeric or oligomeric precursors are present as the sol for the subsequent condensation reaction to give the polysiloxanes. If colored coatings are to be obtained with the composition, dyes/pigments may be mixed in in the manner already described.

Said advantages and further advantages of the invention are evident in the examples which now follow, in conjunction with the subclaims. The individual features can be realized alone or in combination with one another.

EXAMPLES

For coating sanitary fittings, in each case two bodies of a so-called single-lever mixer (without head and control part) comprising brass or comprising the plastics material ABS (acrylonitrile-butadiene-styrene copolymer) are provided. A nickel coat is applied to these bodies by chemical nickel plating in a manner known to the person skilled in the art. Commercial chemical nickel solutions can be used for this purpose.

The nickel-coated bodies thus obtained are divided into two groups, each group consisting of a nickel-coated ABS body and a nickel-coated brass body. The two bodies of one group are coated directly according to the invention, whereas the two bodies of the second group are provided with a silver coat prior to this coating.

For coating with silver, the nickel-coated bodies of the second group are electrolytically coated with a commercially available silver electrolyte (type Arguna 621, from OMG, Germany). The coat thickness of the silver is 2 µm.

The silver surface thus obtained is rinsed with demineralized water and then with ethanol. This silver-coated substrate is immersed in a 1 mmol ethanolic solution of 11-mercapto-1-undecanol and left in this solution for 24 h. Thereafter, the substrate thus treated is rinsed first with ethanol and then with demineralized water and is then dried.

Both the bodies of the first group (nickel-coated bodies) and the bodies of the second group (silver-coated bodies) can then be further coated according to the invention.

For this purpose, an organosilane mixture comprising two organosilanes in the ratio 1:1 is first provided. The first organosilane is a 5% strength aqueous solution of a modified fluoroalkylsilane (Dynasylan 8800, Degussa, Germany). This product is obtained as an ethanolic solution and can be diluted with water in a corresponding manner. The second organosilane is a solution of 5 g of 1,2-bistriethoxysilylethane (BTSE, Merck, Germany) in 30 ml of ethanol.

For the preparation of the composition according to the invention (organosilane mixture), the solution of BTSE in ethanol is prehydrolyzed for 1 h. This prehydrolysis product is slowly added dropwise with stirring to about 50 ml of dilute acetic acid (pH=3.5). The solution thus obtained is stirred for a further 1 h and mixed with the 5% strength solution of Dynasylan 8800.

The final composition thus obtained is sprayed onto the metallic surfaces of the four bodies, in particular at a spray admission pressure of 2 bar and with a minimum metering opening of the spray nozzle (diameter 0.7 mm) of the spray gun. The coating thus obtained is allowed to partly dry and is then subjected to a thermal aftertreatment at a temperature of 70° C. This aftertreatment is carried out over a period of 45 minutes.

In the case of all four bodies, a firmly adhering cohesive polysiloxane coating having outstanding properties is obtained. The visual appearance of the overcoated metallic surfaces (nickel or silver) is fully retained. Scratch-resistant surfaces of high transparency and low reflectivity which are easy to clean are formed. Even over longer periods, outstanding corrosion resistance is present and, in the case of the silver-coated bodies, reliable antitarnish properties.

What is claimed is:

1. A method for coating sanitary articles including sanitary fittings, having at least partly metallic surfaces, comprising the steps of:
    providing metallic surfaces,
    applying an organosilane mixture comprising a modified fluoroalkylsilane and 1,2-bistriethoxysilylethane to the metallic surfaces by a sol-gel method thus obtaining a coating, and
    converting the coating thus obtained into a polysiloxane coating.

2. The method as claimed in claim 1, wherein the conversion of the coating into the polysiloxane coating is carried out by thermal treatment at temperatures of about 70° to 100° C.

3. The method as claimed in claim 1, wherein the polysiloxane coating has a thickness of about 1 to 5 µm.

4. The method as claimed in claim 1, wherein the organosilane mixture is applied as a colloidal aqueous solution with a solids content.

5. The method of claim 4, wherein the solids content is about 1% to 30% by weight.

6. The method as claimed in claim 1, wherein the metallic surfaces are provided on a plastics body.

7. The method of claim 6, wherein the plastics body comprises ABS.

8. The method as claimed in claim 1, wherein the metallic surfaces are provided on a body containing stainless steel, aluminum, die cast zinc or brass.

9. The method as claimed in claim 1, wherein the metallic surfaces contain nickel, palladium-nickel (PdNi), nickel-tungsten (NiW) or chromium.

10. The method as claimed in claim 1, wherein the metallic surfaces contain copper or a noble metal.

11. The method as claimed in claim 10, comprising applying a primer to the metallic surfaces before application of the organosilane.

12. The method as claimed in claim 11, wherein the primer comprises a long-chain, ω-functionalized mercaptan.

13. The method as claimed in claim 12, wherein the chain of the primer includes methylene units or ethylene glycol units.

14. The method as claimed in claim 13, wherein the primer comprises 11-mercapto-1-undecanol.

15. The method of claim 1, further comprising at least one pretreatment step for activating the metallic surfaces prior to application of the organosilane to the metallic surfaces.

16. The method of claim 1, wherein the modified fluoroalkylsilane is one of 1H,1H,2H,2H-perfluorooctyltriethoxysilane or 1H,1H,2H,2H-perfluorodecyltriethoxysilane.

* * * * *